United States Patent [19]

Kass et al.

[11] Patent Number: 5,628,525
[45] Date of Patent: May 13, 1997

[54] ANTI-SWAY FRICTION PADS FOR TRAILER HITCH

[75] Inventors: John J. Kass; Richard McCoy, both of Granger, Ind.

[73] Assignee: Reese Products, Inc., Elkhart, Ind.

[21] Appl. No.: 568,870

[22] Filed: Dec. 7, 1995

Related U.S. Application Data

[63] Continuation of Ser. No. 546,385, Oct. 20, 1995.
[51] Int. Cl.$^6$ ........................................................ B60D 1/42
[52] U.S. Cl. ............................................ 280/406.2; 280/455.1
[58] Field of Search ............................ 280/405.1, 406.1, 280/406.2, 407, 455.1, 432, 456.1

[56] References Cited

U.S. PATENT DOCUMENTS 3,194,584   7/1965   Reese ............................. 280/406.2
3,273,911   9/1966   Waldie ........................... 280/455.1
3,779,582  12/1973   Hedgepeth ..................... 280/455.1
3,785,680   1/1974   Good et al. ..................... 280/455.1
3,825,282   7/1974   Meinholdt ...................... 280/455.1
4,003,586   1/1977   Luck .............................. 280/455.1
4,679,812   7/1987   Byrnes ........................... 280/406.2
5,222,754   6/1993   Few ............................... 280/455.1
5,375,867  12/1994   Kass et al. ...................... 280/457

*Primary Examiner*—Kevin Hurley
*Attorney, Agent, or Firm*—King & Schickli

[57] ABSTRACT

A friction pad assembly for supporting a spring bar of a weight distributing hitch on a trailer includes a pad of high friction material and a mounting bracket. Preferably the friction pad provides a coefficient of friction of at least 0.35. The bracket is preferably L-shaped and includes a projecting flange for protecting an edge of the pad held on the bracket. A fastener, such as self tapping screws, may be used to secure the bracket and pad to the trailer.

2 Claims, 2 Drawing Sheets

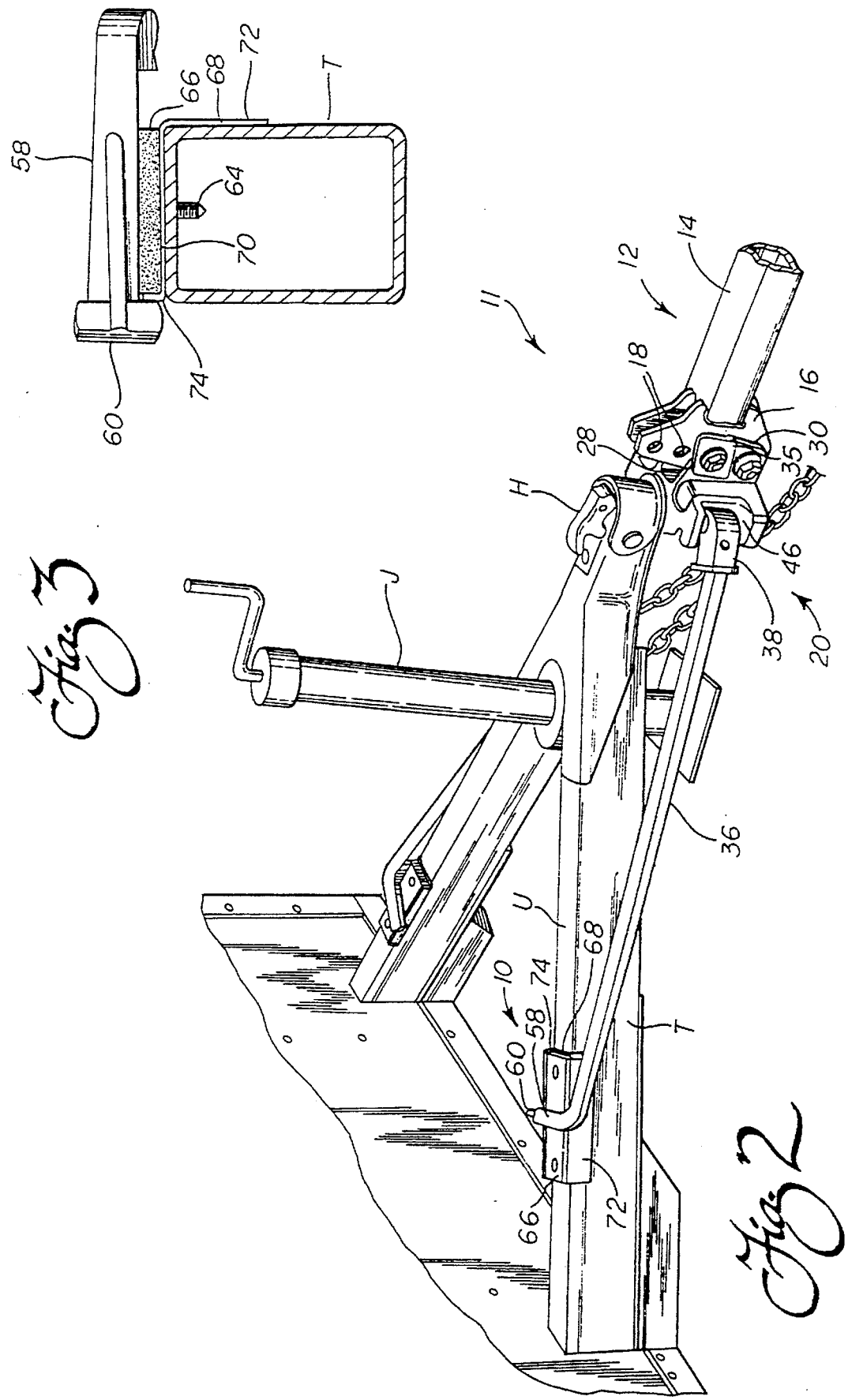

ANTI-SWAY FRICTION PADS FOR TRAILER HITCH

This is a continuation of U.S. patent application Ser. No. 08/546,385, filed Oct. 20, 1995 pending and entitled, "Hitch Having Spring Bars with Integral Hanger".

TECHNICAL FIELD

The present invention relates generally to the towing field and, more particularly, to anti-sway friction pads for supporting the spring bars of an improved weight distributing hitch assembly.

BACKGROUND OF THE INVENTION

Hitch assemblies for more evenly distributing the tongue weight of a trailer over the front and rear axles of a towing vehicle are well known in the art. A particularly advanced design of weight distributing hitch assembly is disclosed in the assignee's issued U.S. Pat. No. 5,375,872 to Kass et al. entitled "Weight Distributing Hitch". This hitch assembly includes a hitch bar for receipt in a receiver mounted to the vehicle and a ball mount head for mounting on the hitch bar at a selected tilt angle. A pair of spring bars are mounted at their proximal end to the ball mount head. The distal ends of these spring bars are connected by means of cooperating lift units and chains to the frame of the trailer. Such state of the art lift units are exemplified by Reese Products, Inc. product number 21160 incorporating a body that is mounted to the trailer frame, a chain hook with pivoting locking lever and a safety pin for securing the chain hook and lever in an operative position. As is known in the art, the amount of leveling or load transfer to the front axle of the vehicle is adjusted by engaging different links of the chains with the chain hooks of the lift units.

While such an arrangement is effective for its intended purpose, the lift units must be properly mounted to the trailer frame and the proper chain links engaged in the chain hooks in order to provide proper operation and a desired distribution of weight. While relatively simple, these procedures require some time to complete and may frustrate and annoy certain impatient individuals. Accordingly, a need is identified for a weight distributing hitch assembly allowing even greater ease and convenience of installation and operation. This is particularly true with respect to the connection of the distal end of the spring bars to the trailer frame in order to provide the weight distributing action.

Further, such an arrangement provides little inherent control of trailer sway: that is, the undesirable lateral movement of the trailer relative to the towing vehicle. Such sway may arise as a result of a number of factors often encountered during towing including uneven, rough and/or winding road conditions; gusty cross-wind weather conditions; and/or result from inherently incompatible trailer or towing vehicle suspension characteristics. Accordingly, a need is also identified for a means of inherently controlling trailer sway to maximize driver confidence, comfort and control during towing.

SUMMARY OF THE INVENTION

Accordingly, it is a primary object of the present invention to provide a weight distributing hitch assembly with a simple means of spring bar installation and some inherent trailer sway control thereby overcoming the limitations and disadvantages of the prior art.

Another object of the present invention is to provide a friction pad assembly for supporting the spring bars of a weight distributing hitch wherein the friction pad assembly is a light weight and compact configuration that functions to increase resistance to relative sliding movement of the spring bars during towing thereby providing added resistance to trailer sway. In this way towing performance and overall driver comfort are both advantageously increased.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a friction pad assembly is provided for supporting a spring bar of a weight distributing hitch on a trailer. As is known in the art, such a weight distributing hitch includes a hitch bar of a type known in the art for mounting to the towing vehicle. More specifically, the hitch bar includes a mounting post that is received in the receiver box of a hitch receiver that is secured to the frame of the towing vehicle in a well known manner.

The weight distributing hitch also includes a ball mount head mounted on the distal or head-receiving end of the hitch bar. Preferably, a hitch ball, also of a type well known in the art, is carried on the ball mount head. Such a hitch ball is adapted for receipt in a cooperating trailer coupler socket of the trailer to be towed behind the vehicle.

Additionally, a pair of spring bars are provided for distributing the trailer weight relative to the axles of the vehicle. Each of the pair of spring bars includes a proximal end that is mounted by means of a trunnion arrangement to the ball mount head and a distal end having a lug for engaging a cooperating friction pad assembly on the frame of the trailer wherein the spring bar is in an operative, weight distributing position bridging between the ball mount head and trailer frame.

More specifically describing the invention, each friction pad assembly includes a pad of high friction material having a coefficient of friction of at least 0.35. Further, means are provided for mounting the friction pad to the trailer.

More specifically, these mounting means may include a mounting bracket for holding the friction pad and a fastener such as self tapping screws for securing the friction pad and mounting bracket to a rail of the trailer frame. Preferably, the bracket is substantially L-shaped for nesting over the rail of the trailer from where it could alternatively be secured by welding or other appropriate means. Additionally, the bracket preferably includes an upwardly depending flange for protecting the edge of the friction pad held on the bracket.

Each friction pad is mounted to the trailer so as to overlie the frame at a point where the friction pad receives and supports a lug of one of the pair of spring bars. From this positioning the friction pads provide some frictional resistance to relative sliding movement of the spring bar lugs across the trailer frame. As a result, trailer sway is resisted and controlled and vehicle towing performance and driver comfort is increased.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 2 is a perspective view showing the weight distributing hitch operatively connected to a trailer with the spring bars thereof engaging the friction pad assemblies mounted on the trailer; and FIG. 3 is a detailed partially sectional view showing a spring bar lapped over a friction pad assembly secured on the trailer frame.

Figure 1:
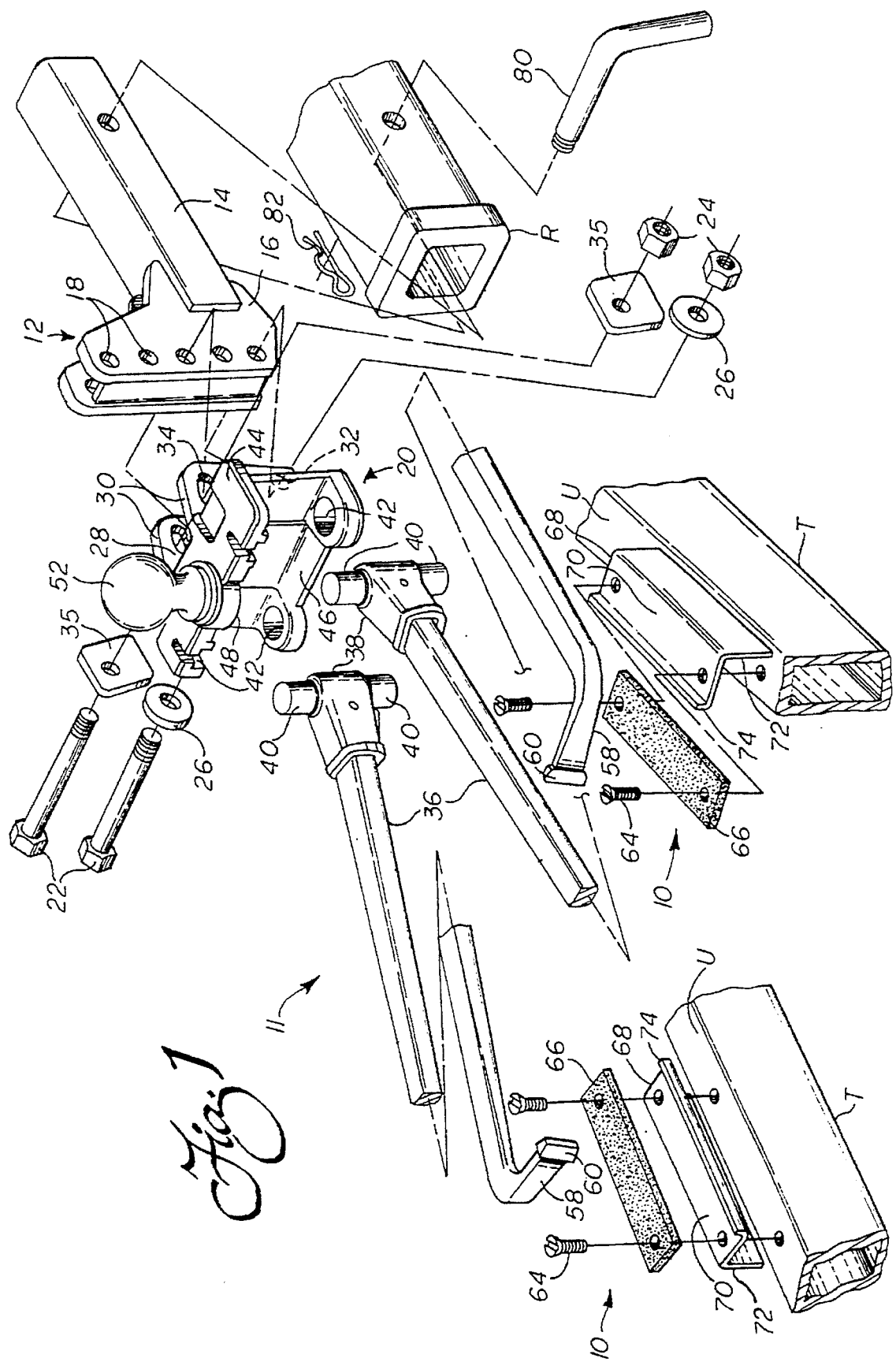
FIG. 1 is an exploded perspective view showing the friction pad assembly of the present invention and its incorporation into a weight distributing hitch.

Reference will now be made in detail to the present preferred embodiment of the invention, an example of which is illustrated in the accompanying drawing.

DETAILED DESCRIPTION OF THE INVENTION

Reference is now made to FIG. 1 showing the friction pad assembly 10 of the present invention as it is incorporated into a weight distributing hitch assembly 11. As should be appreciated, the hitch assembly 11 includes a hitch bar 12 of a type known in the art including a tubular mounting post 14 for engagement in a receiver box R of a hitch receiver mounted to a vehicle (not shown). Such a hitch receiver is, for example, a Class II or III hitch receiver with two inch opening as manufactured by Reese products, Inc. of Elkhart, Ind., the assignee of the present invention.

The distal end of the hitch bar 12 includes a split end mounting rack 16 having a series of aperture sets 18 allowing for height adjustment of the ball mount head 20. The ball mount head 20 may be a one-piece, integral construction cast from ductile iron. The ball mount head 20 is secured to the mounting rack 16 of the hitch bar 12 by means of two cooperating fasteners shown as bolts 22 and cooperating lock nuts 24. Washers 26 may also be provided.

More specifically the ball mount head 20 includes a substantially U-shaped spring bar mounting bracket 28 and a pair of spaced, parallel mounting flanges 30 so as to form a yoke adapted to receive the mounting rack 16. When properly mounted, the lower bolt 22 extends through the aligned cooperating apertures 32 (only one visible in FIG. 1) in the mounting flanges 30 and the one aligned aperture set 18 in the interdisposed mounting rack 16. Similarly, upper bolt 22 extends through an indexable, eccentric washer 35, the aligned cooperating arcuate slots 34 in the mounting flanges 30 and through a second aligned aperture set 18 in the interdisposed mounting rack 16. The arcuate slots 34 allow the ball mount head 20 to be pivoted relative to the hitch bar 12 about the lower bolt 22. Washers 26 are provided on the lower bolt 22 at each exposed side of the mounting flanges 30. Next, the bolts 22 and cooperating lock nuts 24 are then tightened. This arrangement allows the tilt angle of the ball mount head 20 to be selected by manipulation of the indexable, eccentric washer 35 in a manner described in detail in previously referenced U.S. Pat. No. 5,375,872 to Kass et al.

As further shown with reference to FIG. 1, the mounting bracket 28 includes an upper platform 44 having an aperture 48 for receiving a hitch connector such as hitch ball 52. The hitch ball 52 is secured in place by welding or other means known in the art.

As also shown in FIG. 1, the weight distributing hitch assembly 11 includes a pair of spring bars 36. Each spring bar 36 includes a trunnion 38 at its proximal end for mounting in the ball mount head 20. More specifically, each mounting trunnion 38 includes a pair of oppositely disposed and outwardly projecting pivot pins 40. As is known in the art, the pivot pins 40 on the trunnion 38 are received in a first set of cooperating sockets 42 in the upper and lower legs or platforms 44, 46 of the ball mount head 20. A more detailed presentation of the trunnion connection of the spring bars 36 to the ball mount head 20 is presented in the assignee's co-pending U.S. patent application Ser. No. 08/319,908, filed on Oct. 7, 1994, entitled "Weight Distributing Hitch Assembly", the disclosure of which is fully incorporated herein by reference.

In accordance with an important aspect of the present invention, each spring bar 36 includes a lug 58 adjacent the distal end thereof that projects inwardly in a transverse direction. Thus, the lug 58 and main body of the spring bar 36 form a substantially L-shape. As will be described in greater detail below, the lugs 58 allow the distal end of the spring bars 36 to be secured to the frame of the trailer T (see also FIG. 2) in a straightforward and convenient manner. This provides ease of installation.

As further shown in FIGS. 1 and 3, each lug 58 includes an integrally depending retaining tab 60. The lug 58 and cooperating retaining tab 60 on each spring bar 36 are geometrically arranged so that each lug extends in a first plane and each retaining tab extends in a second plane substantially perpendicular to the first plane. As will be described in greater detail below, the retaining tab 60 allows one to visually confirm that an associated spring bar 36 has been properly connected to the frame of a trailer T to provide weight distributing action. Additionally, each retaining tab 60 functions to maintain the spring bar 36 associated therewith in proper position with the cooperating lug 58 overlying the upper surface U of the frame of the trailer T.

So as to resist and control trailer sway often experienced when traversing undulating pavement and/or sweeping curves at highway speeds and thereby improve overall ride quality/trailer hitch performance, the weight distributing hitch assembly 11 may also include a pair of friction pad assemblies 10 of the present invention. Each friction pad assembly 10 is mounted to the upper surface U of the frame of the trailer T directly behind the trailer coupler socket H. In this position, one friction pad assembly 10 receives and supports each spring bar 36. The mounting of the friction pad assemblies 10 may be by any means known in the art including, for example, an adhesive, by welding or with a fastener such as self-tapping screws 64 shown in FIG. 1.

Preferably, each friction pad assembly 10 includes a friction pad 66 formed from a high friction material such as available from Friction Material Company under product designation NA104. Preferably the friction pad material provides a coefficient of friction of at least 0.35 and has surface dimensions of approximately 1.5 by 6.0 inches. Each friction pad assembly 10 also includes a supporting mounting bracket 68 preferably formed from a sheet metal such as steel. More specifically, the friction pad 66 is bonded to a first planar section 70 of the mounting bracket 68 so as to provide underlying support. Additionally, mounting bracket 68 includes a second planar section 72 that forms a substantially 90° included angle with the first planar section 70 (i.e. the bracket 68 is substantially L-shaped as shown best in FIG. 3). Together, the sections 70, 72 define a mounting pocket for engaging the frame of the trailer T. Additionally, the mounting bracket 68 includes a projecting friction pad edge flange 74.

As described in greater detail below, the edge flange 74 serves several functions. The flange 74 protects the inwardly disposed edge of the friction pad 66 from being damaged by frictional engagement with the retaining tab 60 during towing. The flange 74 also engages the retaining tab 60 and functions as a guide when the associated spring bar 36 slides relative to the frame of the trailer T during towing. Thus, the spring bars 36 are maintained in position with the lugs 58 overlying the frame of the trailer T while resting upon the friction pads 66.

More specifically, sliding movement of the spring bars 36 relative to the friction pads 66 is generated whenever the trailer T begins to sway in response to, for example, rough, uneven and/or winding road conditions, gusts and crosswinds, and uneven trailer loading. At these and certain other times the frictional forces generated by the engagement of the spring bar lugs 58 with the friction pads 66 oppose or resist the lateral movement of the towed trailer T relative to the towing vehicle. Trailer sway is consequently reduced or virtually eliminated under substantially any anticipatable operating conditions.

It should be appreciated, however, that the degree of resistance to transverse movement is not great enough to interfere with the relative pivotal motion of the trailer about the hitch ball and coupler socket that occurs as a result of driver input during normal vehicle operation. Thus, the trailer still properly tracks behind the vehicle during towing. Thus, it should be appreciated that sway control is advantageously provided without any compromise of other important operating characteristics.

Advantageously, as should be appreciated from the above comments, the lugs 58 and retaining tabs 60 function as an integral spring bar hanger that allows direct connection of the distal ends of the spring bars 36 to the frame of the trailer T (see FIG. 2). In use, the height of the forward end of the trailer T including the coupler socket H is adjusted up or down using the tongue jack J until the trailer is level. When level, the distance from the ground to the top of the coupler socket H is also measured. Next, the hitch bar 12 is inserted into the receiver box R and secured in place utilizing a pull pin 80 and clip 82 in accordance with a procedure well known in the art. Next, the ball mount head 20 is installed on the mounting rack 16 at a selected height so that the hitch ball 52 is nearest to the height of the coupler socket H. With the vehicle and trailer in line, the hitch socket H is placed on the hitch ball 52. The coupler latch is then closed to secure the trailer to the towing vehicle through the hitch assembly 11.

Next the tongue jack J is raised about 2-3 inches or more. From this position an individual may grasp an intermediate portion of the spring bar 36 adjacent the distal end thereof and position the spring bar upwardly so that the lug 58 extends or projects over the top surface U of one of the frame rails of the trailer T. The friction pad assemblies 62 are then positioned on the upper surface U of the frame rails of the trailer T. More specifically, the friction pad assemblies are positioned so that the lug 58 of each spring bar 36 is centered on one friction pad 66. The necessary holes are then drilled in the frame rails and the friction pad assemblies 62 are secured in position by means of the self-tapping screws 64.

Next, the tongue jack J is lowered in order to check the coupler H height. If the top of the coupler socket H is more than ½ inch lower than the original measurement, the tongue jack J is raised, and the spring bars 36 are disconnected from the frame rails of the trailer T. The tongue jack J is then lowered and the eccentric washer 35 is adjusted to index the ball mount head 20 to a new tilt angle. The tongue jack J is then again raised to allow installation of the spring bars 36 with the lugs 58 overlying the frame rails of the trailer T. The tongue jack J is then again lowered to check the coupler socket H height. Once proper height is established the ball mount nuts 24 are torqued to 85 lb ft.

Advantageously, by simply positioning the spring bars 36 to hang by means of the integral lugs 58 from the trailer frame rails, one is able to operatively position the spring bars to provide the desired weight distributing action. This is a simple operation that may be completed in one movement to the utmost convenience and satisfaction of the user. There is no need to select a proper chain link or secure a lift bracket with a safety clip as required by state of the art lift units commonly utilized in this field.

Of course, it should be appreciated that not only is the weight distributing hitch assembly 11 of the present invention easier to use, it is a simpler structure that is less expensive to produce. The prior art lift brackets with their latch mechanism and chain link connection are eliminated and replaced with spring bars 36 having integral lugs 58 and the friction pads 66 that provide some added resistance to the sliding movement of the lugs 58 of the spring bars 36 relative to the frame of the trailer T as the trailer pivots about the hitch ball 52 during towing. As a result, any swaying motion imparted to the trailer during towing is resisted or dampened. Further, this is achieved without interfering with proper pivotal movements of the trailer and sliding motion of the spring bars 36 initiated by vehicle operator inputs when turning during towing. Thus, the present hitch assembly 11 advantageously provides a measure of sway control previously unavailable in state of the art hitches equipped with lift unit and sway bar chain connectors. Consequently, the present invention represents a significant advance in design that achieves more than the prior art hitch designs. Further, this is accomplished by means of a simple structure that is less expensive to produce and more convenient and user friendly to utilize.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A friction pad assembly for supporting a spring bar of a weight distributing hitch on a trailer, comprising:

a pad of high friction material for engaging and supporting said spring bar;

a substantially L-shaped mounting bracket for holding said pad, said mounting bracket including a projecting flange for protecting an edge of said pad held on said bracket; and fastening means for fastening said bracket to said trailer.

2. The friction pad assembly set forth in claim 1, wherein said pad includes a coefficient of friction of at least 0.35.

* * * * *